(12) United States Patent  
Mizuno et al.

(10) Patent No.: US 10,427,693 B2  
(45) Date of Patent: Oct. 1, 2019

(54) VEHICLE-SURROUNDING MONITORING DEVICE AND NON-TRANSITORY COMPUTER READABLE STORAGE MEDIUM

(71) Applicant: DENSO CORPORATION, Kariya, Aichi-pref. (JP)

(72) Inventors: Wataru Mizuno, Kariya (JP); Akihiro Ogasawara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/087,184

(22) PCT Filed: Jan. 16, 2017

(86) PCT No.: PCT/JP2017/001218  
§ 371 (c)(1),  
(2) Date: Sep. 21, 2018

(87) PCT Pub. No.: WO2017/168954  
PCT Pub. Date: Oct. 5, 2017

(65) Prior Publication Data  
US 2019/0039628 A1 Feb. 7, 2019

(30) Foreign Application Priority Data

Mar. 29, 2016 (JP) .................................. 2016-065642  
Dec. 16, 2016 (JP) .................................. 2016-244351

(51) Int. Cl.  
*B60W 50/14* (2012.01)  
*G06K 9/00* (2006.01)  
*G06F 3/01* (2006.01)  
*B60W 30/18* (2012.01)  
*B60W 40/08* (2012.01)

(52) U.S. Cl.  
CPC ...... *B60W 50/14* (2013.01); *B60W 30/18154* (2013.01); *B60W 40/08* (2013.01);  
(Continued)

(58) Field of Classification Search  
CPC ........... B60W 50/14; B60W 30/18154; B60W 40/08; B60W 2040/0818;  
(Continued)

(56) References Cited

U.S. PATENT DOCUMENTS 6,778,073 B2 * 8/2004 Lutter ...................... H04R 5/04  
340/10.1  
7,649,444 B1 * 1/2010 Fear ......................... B60Q 5/00  
340/384.1

(Continued)

FOREIGN PATENT DOCUMENTS

JP 2007210480 A 8/2007  
JP 2008026159 A 2/2008  
(Continued)

*Primary Examiner* — Joseph H Feild  
*Assistant Examiner* — Rufus C Point  
(74) *Attorney, Agent, or Firm* — Harness, Dickey & Pierce, P.L.C.

(57) ABSTRACT

A vehicle-surrounding monitoring device includes: a line-of-sight direction determination section that determines a direction of a line of sight of a driver; an obstacle determination section that determines whether an obstacle is disposed in a predetermined direction around a vehicle; and a notification control section that notifies notification information indicating a determination result of the obstacle determination section in an other direction around the vehicle with a notification unit when it is determined that the direction of the line of sight of the driver is one direction around the vehicle.

12 Claims, 19 Drawing Sheets

(52) U.S. Cl.
CPC ......... *G06F 3/013* (2013.01); *G06K 9/00805* (2013.01); *G06K 9/00845* (2013.01); *B60W 2040/0818* (2013.01); *B60W 2050/143* (2013.01); *B60W 2550/10* (2013.01)

(58) Field of Classification Search
CPC ......... B60W 2050/143; B60W 2550/10; G06F 3/013; G06K 9/00805; G06K 9/00845
See application file for complete search history.

(56) References Cited

U.S. PATENT DOCUMENTS

| | | | |
|---|---|---|---|
| 2002/0110261 A1* | 8/2002 | Yanai | B60R 21/0132 382/104 |
| 2002/0135618 A1* | 9/2002 | Maes | G06F 3/0481 715/767 |
| 2004/0178893 A1* | 9/2004 | Litkouhi | B60Q 9/006 340/435 |
| 2005/0270146 A1* | 12/2005 | Enya | B60Q 5/00 340/438 |
| 2008/0236929 A1 | 10/2008 | Fukaya et al. | |
| 2009/0063030 A1* | 3/2009 | Howarter | G08G 1/096783 701/117 |
| 2018/0031831 A1* | 2/2018 | Iwase | G02B 27/0101 |

FOREIGN PATENT DOCUMENTS

| | | |
|---|---|---|
| JP | 2008250775 A | 10/2008 |
| JP | 2010070127 A | 4/2010 |
| JP | 2013250689 A | 12/2013 |
| WO | WO-2014185042 A1 | 11/2014 |

\* cited by examiner

VEHICLE-SURROUNDING MONITORING DEVICE AND NON-TRANSITORY COMPUTER READABLE STORAGE MEDIUM

CROSS REFERENCE TO RELATED APPLICATIONS

This application is a U.S. National Phase Application under 35 U.S.C. 371 of International Application No. PCT/JP2017/001218 filed on Jan. 16, 2017. This application is based on and claims the benefit of priority from Japanese Patent Applications No. 2016-065642 filed on Mar. 29, 2016, and No. 2016-244351 filed on Dec. 16, 2016. The entire disclosures of all of the above applications are incorporated herein by reference.

TECHNICAL FIELD

The present disclosure relates to a vehicle-surrounding monitoring device and a computer program.

BACKGROUND ART

There is provided a vehicle-surrounding monitoring device that monitors the surroundings of a vehicle (e.g., refer to Patent Literature 1). This kind of vehicle-surrounding monitoring device determines whether an obstacle such as a vehicle or a pedestrian is present around the own vehicle using, for example, an image signal input from a vehicle-surroundings imaging camera or a detection signal input from an ultrasonic sensor. When the vehicle-surrounding monitoring device determines that an obstacle is present, the vehicle-surrounding monitoring device notifies a driver that the obstacle is present.

PRIOR ART LITERATURES

Patent Literature

Patent Literature 1: JP-2010-70127-A

SUMMARY OF INVENTION

A conventional vehicle-surrounding monitoring device is configured to notify a driver of the presence of an obstacle that has been already recognized by the driver. Thus, the driver may feel troublesome.

It is an object of the present disclosure to provide a vehicle-surrounding monitoring device and a computer program that are capable of appropriately notifying a driver that an obstacle is present around the vehicle without giving the driver a troublesome feeling.

According to an aspect of the present disclosure, a line-of-sight direction determination section determines a direction of a line of sight of a driver. An obstacle determination section determines whether an obstacle is disposed in a predetermined direction around a vehicle. A notification control section notifies notification information indicating a determination result of the obstacle determination section in an other direction around the vehicle with a notification unit when it is determined that the direction of the line of sight of the driver is one direction around the vehicle.

When the direction of the line of sight of the driver is one direction around the vehicle, there is a high possibility that the driver recognizes an obstacle in the one direction around the vehicle, but does not recognize an obstacle in the other direction. In this case, a determination result in the one direction around the vehicle in which the possibility that the driver recognizes an obstacle is high is not notified, and a determination result in the other direction around the vehicle in which the possibility that the driver does not recognize an obstacle is high is notified. Accordingly, it is possible to appropriately notify the driver that an obstacle is present around the vehicle without giving the driver a troublesome feeling.

BRIEF DESCRIPTION OF DRAWINGS

The above and other objects, features, and advantages of the present disclosure will become more apparent from the following detailed description with reference to the accompanying drawings. In the drawings.

EMBODIMENTS

First Embodiment

Figure 1:
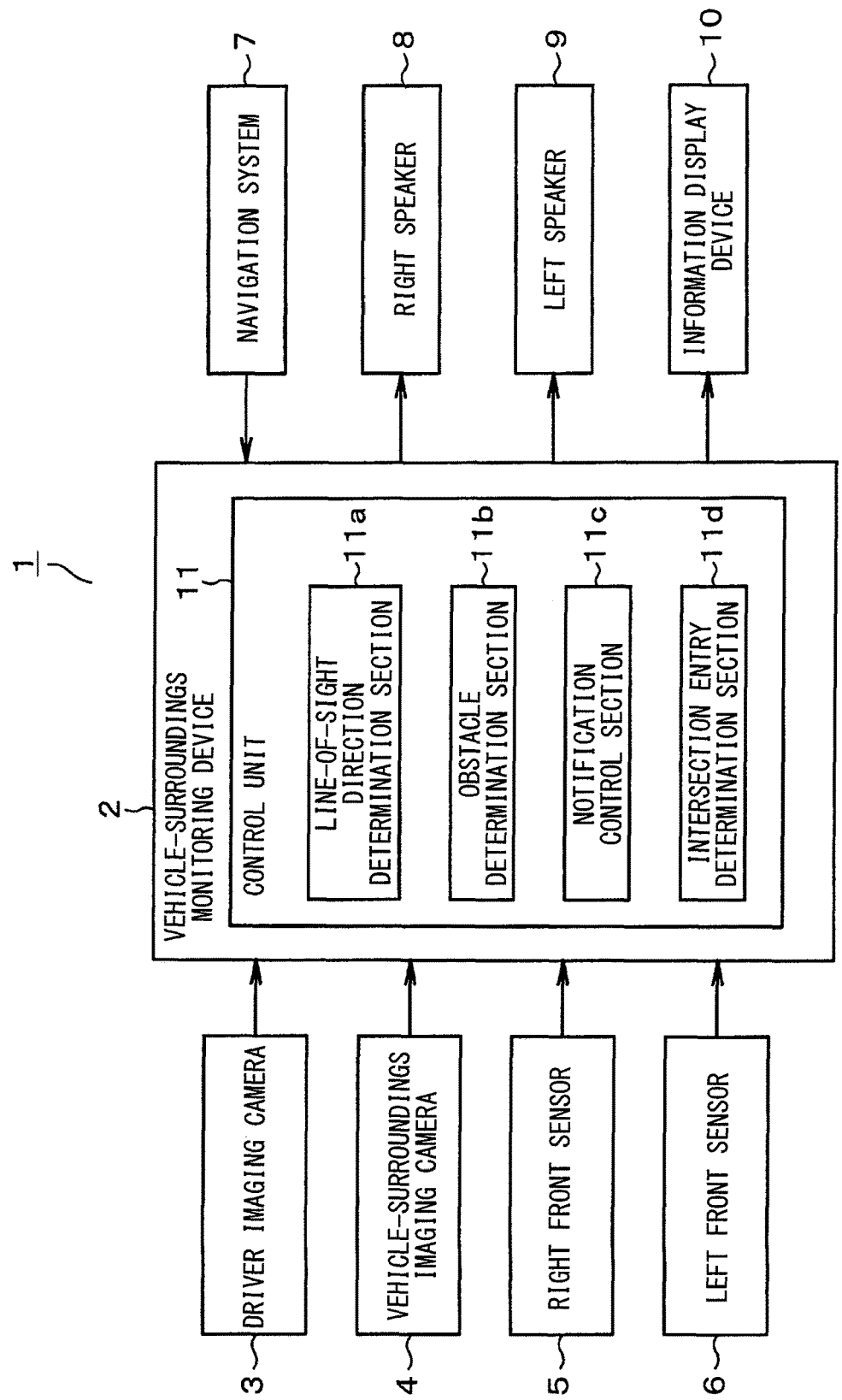
FIG. 1 is a functional block diagram illustrating a first embodiment.
Figure 2:
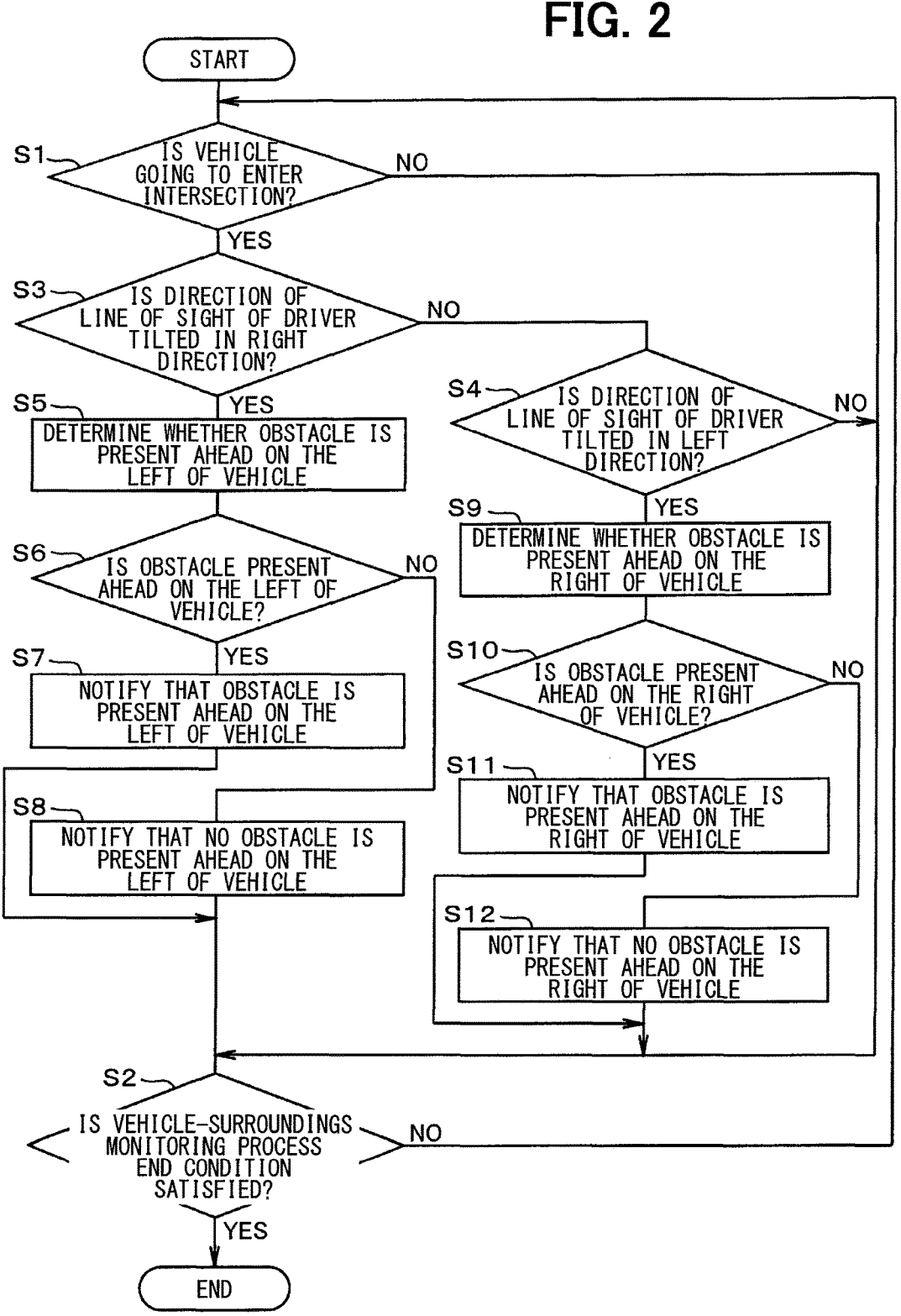
FIG. 2 is a flowchart (No. 1)

Hereinbelow, a first embodiment will be described with reference to FIGS. 1 to 8. A vehicle-surroundings monitoring system 1 includes a vehicle-surrounding monitoring device 2, a driver imaging camera 3, a vehicle-surroundings imaging camera 4, a right front sensor 5, a left front sensor 6, a navigation system 7, a right speaker 8 (corresponding to a notification unit), a left speaker 9 (corresponding to the notification unit), and an information display device 10 (corresponding to the notification unit).

The driver imaging camera 3 captures an image of the upper body of a driver who is seated on a driver seat and faces ahead of a vehicle and outputs an image signal including the captured image to the vehicle-surrounding monitoring device 2. The driver imaging camera 3 is, for example, a charge coupled device (CCD) image sensor or a complementary metal oxide semiconductor (CMOS) image sensor. One driver imaging camera 3 or a plurality of driver imaging cameras 3 may be provided. The vehicle-surroundings imaging camera 4 is disposed in, for example, a front part of a vehicle body. The vehicle-surroundings imaging camera 4 captures an image of an area ahead of the vehicle and outputs an image signal including the captured image to the vehicle-surrounding monitoring device 2. The vehicle-surroundings imaging camera 4 is a camera having an angle of view corresponding to an imaging area ahead on the right and ahead on the left of the vehicle. The vehicle-surroundings imaging camera 4 is also, for example, a CCD image sensor or a CMOS image sensor. One vehicle-surroundings imaging camera 4 or a plurality of vehicle-surroundings imaging cameras 4 may be provided.

The right front sensor 5 is, for example, an ultrasonic sensor that is disposed on a right front part of the vehicle body. The right front sensor 5 detects an obstacle such as a vehicle or a pedestrian ahead on the right of the vehicle, which is a detection area of the right front sensor 5, and outputs a detection signal including a result of the detection to the vehicle-surrounding monitoring device 2. The left front sensor 6 is, for example, an ultrasonic sensor that is disposed on a left front part of the vehicle body. The left front sensor 6 detects an obstacle such as a vehicle or a pedestrian ahead on the left of the vehicle, which is a detection area of the left front sensor 6, and outputs a detection signal including a result of the detection to the vehicle-surrounding monitoring device 2. A laser detection and ranging (LADAR) or a light detection and ranging (LIDAR) may be employed instead of the ultrasonic sensor.

The navigation system 7 has a function of identifying the current position of the vehicle and a function of identifying the position of an intersection on a road where the vehicle is currently traveling. The navigation system 7 outputs a navigation signal including various pieces of navigation information such as the distance from the current position of the vehicle to the intersection to the vehicle-surrounding monitoring device 2. The right speaker 8 is disposed on the right side of the driver seat inside a cabin. When a voice output command signal is input to the right speaker 8 from the vehicle-surrounding monitoring device 2, the right speaker 8 outputs voice information. The left speaker 9 is disposed on the left side of the driver seat inside the cabin. When a voice output command signal is input to the left speaker 9 from the vehicle-surrounding monitoring device 2, the left speaker 9 outputs voice information. When a display command signal is input to the information display device 10 from the vehicle-surrounding monitoring device 2, the information display device 10 projects and displays display information on a windshield.

The vehicle-surrounding monitoring device 2 includes a control unit 11. The control unit 11 includes a microcomputer that includes a central processing unit (CPU), a read only memory (ROM), a random access memory (RAM), and an input/output (I/O). The control unit 11 executes a computer program stored in a nontransitive and substantive storage medium to execute a process corresponding to the computer program to control the entire operation of the vehicle-surrounding monitoring device 2.

The control unit 11 includes a line-of-sight direction determination section 11a, an obstacle determination section 11b, a notification control section 11c, and an intersection entry determination section 11d. Each of the sections 11a to 11d is composed of a computer program executed by the control unit 11 and implemented by software.

The line-of-sight direction determination section 11a analyzes a movement of the head or the eyeballs of the driver using an image signal input from the driver imaging camera 3 to determine the direction of a line of sight of the driver. The obstacle determination section 11b determines whether an obstacle is present ahead of the vehicle using an image signal input from the vehicle-surroundings imaging camera 4 and detection signals input from the right front sensor 5 and the left front sensor 6. The obstacle determination section 11b is capable of partially preferentially processing an image signal input from the vehicle-surroundings imaging camera 4. For example, the obstacle determination section 11b is capable of performing processing of an image signal corresponding to one of the right and left sides of the angle of view of the vehicle-surroundings imaging camera 4 in preference to processing of an image signal corresponding to the other side of the angle of view. That is, for example, the obstacle determination section 11b is capable of performing processing of an image signal including an image of an area ahead on the right of the vehicle in preference to processing of an image signal including an image of an area ahead on the left of the vehicle. Further, the obstacle determination section 11b is capable of processing any of detection signals input from the right front sensors 5, 6. For example, the obstacle determination section 11b is capable of performing processing of a detection signal input from the right front sensor 5 in preference to processing of a detection signal input from the left front sensor 6. Here, "preferentially performing processing" means applying a difference in a processing speed or a sampling period.

The notification control section 11c outputs a voice output command signal to the speakers 8, 9 to cause the speakers 8, 9 to output voice information. Further, the notification control section 11c outputs a display command signal to the information display device 10 to cause the information display device 10 to display display information. The intersection entry determination section 11d determines whether the vehicle is going to enter an intersection using a navigation signal input from the navigation system 7.

Next, the action of the configuration described above will be described with reference to FIGS. 2 to 8.

The control unit 11 performs a vehicle-surroundings monitoring process. For example, when a vehicle-surroundings monitoring process start condition, such as switching of an ignition switch from off to on, is satisfied, the control unit 11 starts the vehicle-surroundings monitoring process. The vehicle-surroundings monitoring process start condition of the control unit 11 may be a vehicle speed of a certain speed or higher or a predetermined operation performed by the driver.

When the control unit 11 starts the vehicle-surroundings monitoring process, the control unit 11 determines whether the vehicle is going to enter an intersection by the intersection entry determination section 11d (S1). When the control unit 11 determines that the vehicle is not going to enter an intersection (S1: NO), the control unit 11 determines whether a vehicle-surroundings monitoring process end condition is satisfied (S2).

On the other hand, when the control unit 11 determines that the vehicle is going to enter an intersection (S1: YES), the control unit 11 determines the direction of the line of sight of the driver by the line-of-sight direction determination section 11a (S3, S4). The control unit 11 calculates a traveling direction of the vehicle, for example, from a steering angle. When the control unit 11 determines that a time during which the direction of the line of sight of the driver is tilted by a predetermined angle or more in the right direction relative to the traveling direction of the vehicle has continued for a predetermined time (e.g., several seconds), the control unit 11 determines that the direction of the line of sight of the driver is tilted in the right direction (S3: YES). Then, the control unit 11 determines whether an obstacle is present ahead on the left of the vehicle by the obstacle determination section 11b (S5). At this time, the control unit 11 performs processing of an image signal corresponding to the left side of the angle of view of the vehicle-surroundings imaging camera 4 in preference to processing of an image signal corresponding to the right side of the angle of view. Further, the control unit 11 performs processing of a detection signal input from the left front sensor 6 in preference to processing of a detection signal input from the right front sensor 5.

Figure 3:
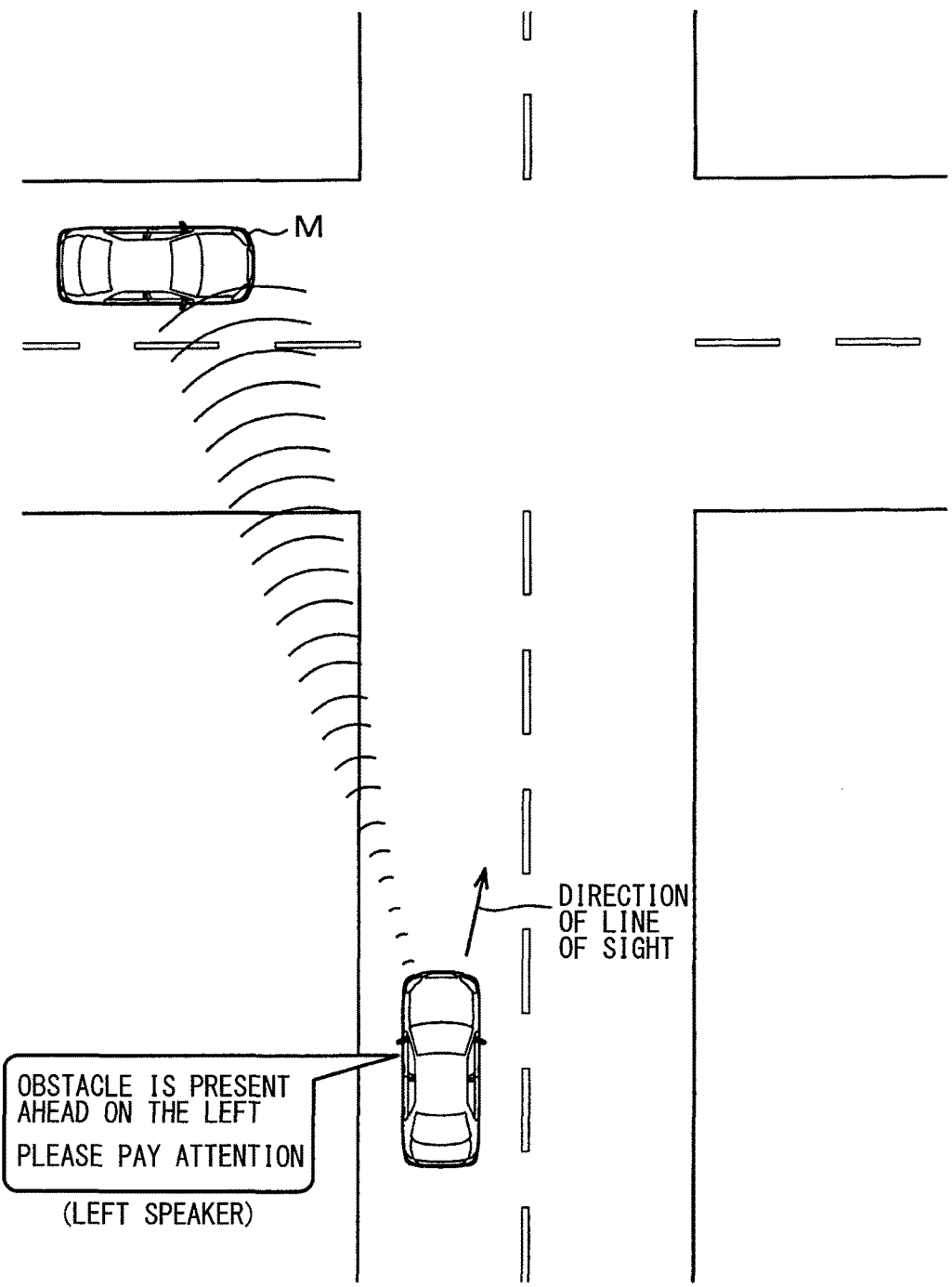
FIG. 3 is a diagram illustrating a mode in which the presence of an obstacle is determined (No. 1)
Figure 4:
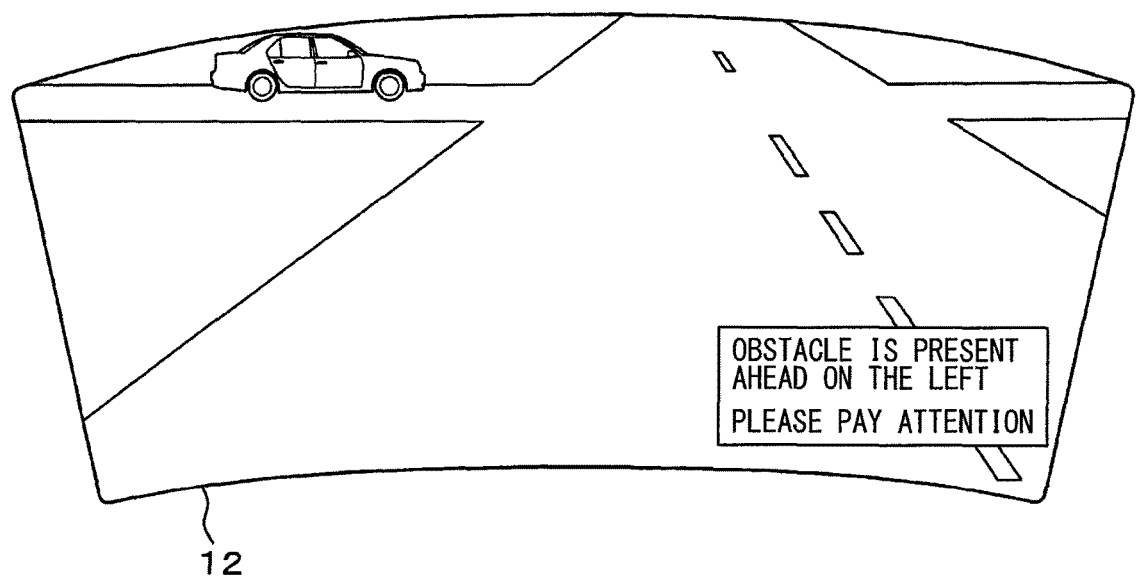
FIG. 4 is a diagram illustrating a mode in which display information is displayed (No. 1)

When the control unit 11 determines that an obstacle is present ahead on the left of the vehicle (S6: YES), the control unit 11 notifies that the obstacle is present ahead on the left of the vehicle by the notification control section 11c (S7). Specifically, as illustrated in FIG. 3, when another vehicle M in a state of waiting for the entry into an intersection ahead on the left of the vehicle is detected as an obstacle when the direction of the line of sight of the driver is tilted in the right direction, the control unit 11 outputs a voice output command signal to the left speaker 9 to cause the left speaker 9 to output voice information such as "an obstacle is present ahead on the left, please pay attention". Further, as illustrated in FIG. 4, the control unit 11 outputs a display command signal to the information display device 10 to cause the information display device 10 to project and display display information such as "an obstacle is present ahead on the left, please pay attention" on the right side of a windshield 12. Accordingly, the driver can recognize that the obstacle is present ahead on the left of the vehicle while looking ahead on the right of the vehicle. Further, no information relating to the right-forward direction, which is the direction of the line of sight of the driver, is notified. Thus, the driver does not feel troublesome.

Figure 5:
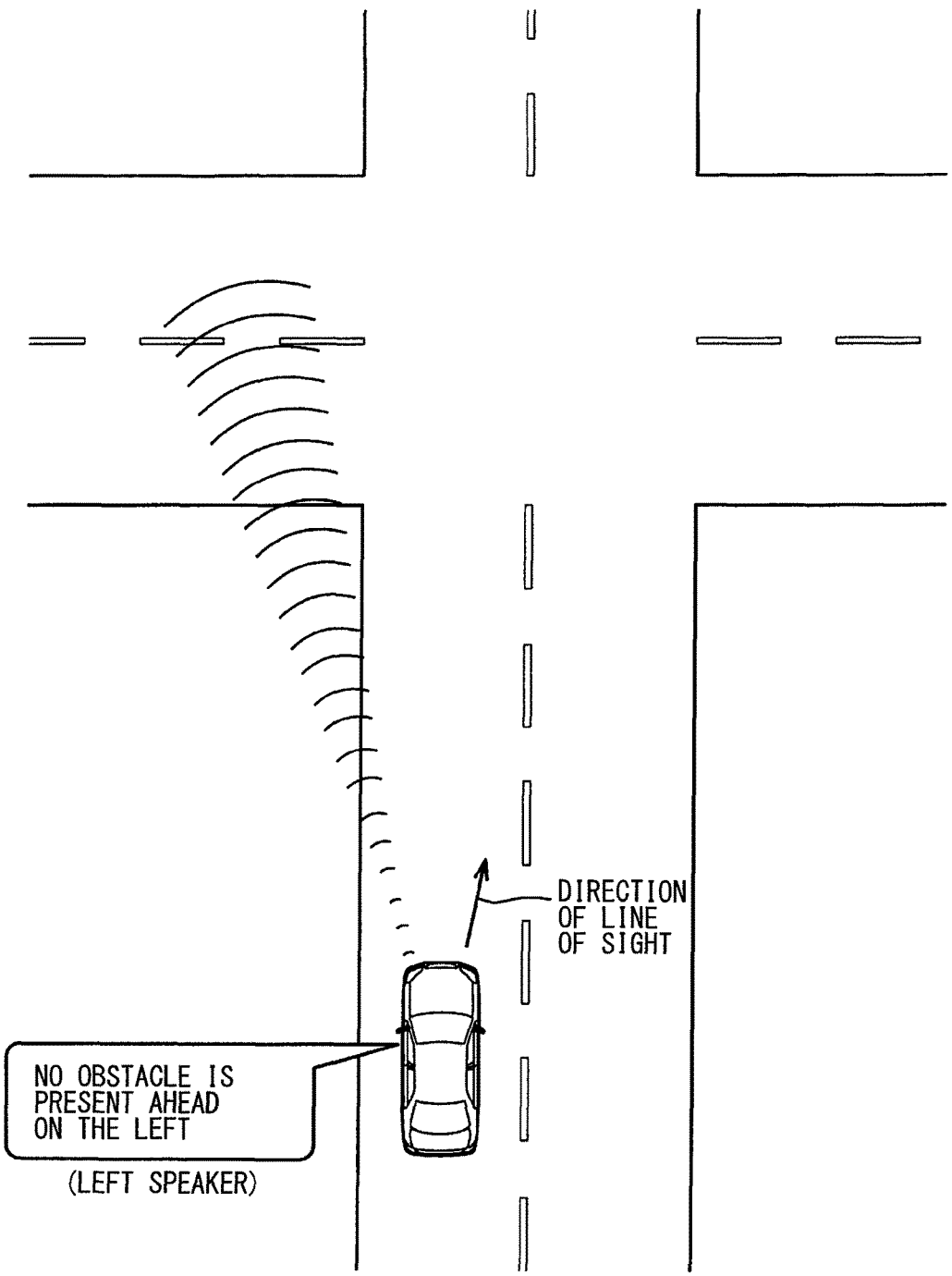
FIG. 5 is a diagram illustrating a mode in which the presence of an obstacle is determined (No. 2)
Figure 6:
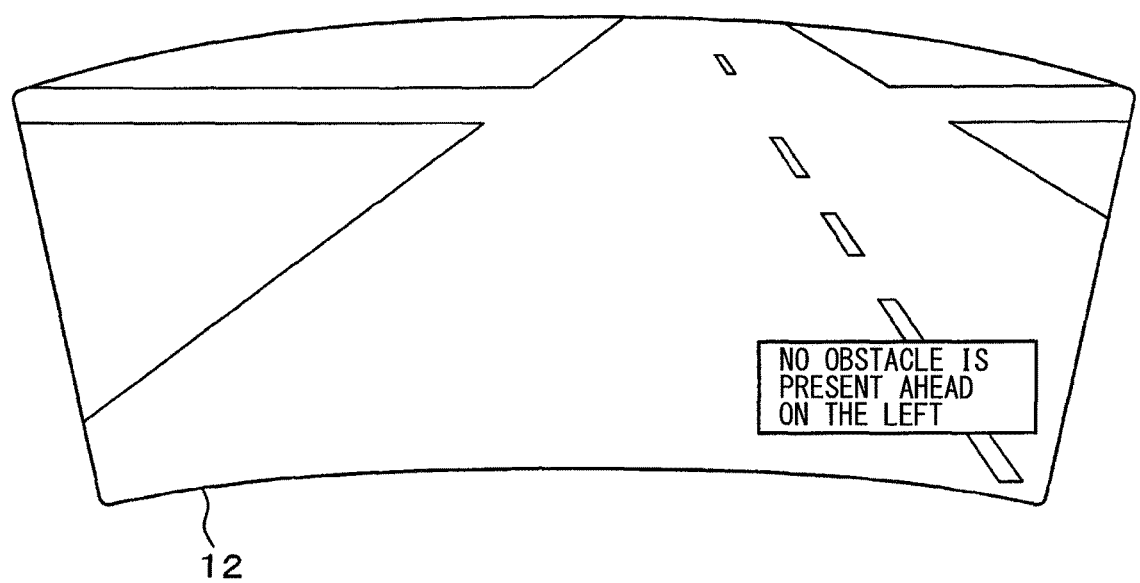
FIG. 6 is a diagram illustrating a mode in which display information is displayed (No. 2)

On the other hand, when the control unit 11 determines that no obstacle is present ahead on the left of the vehicle (S6: NO), the control unit 11 notifies that no obstacle is present ahead on the left of the vehicle by the notification control section 11c (S8). Specifically, as illustrated in FIG. 5, when no obstacle is detected ahead on the left of the vehicle when the direction of the line of sight of the driver is tilted in the right direction, the control unit 11 outputs a voice output command signal to the left speaker 9 to cause the left speaker 9 to output voice information such as "no obstacle is present ahead on the left". Further, as illustrated in FIG. 6, the control unit 11 outputs a display command signal to the information display device 10 to cause the information display device 10 to project and display display information such as "no obstacle is present ahead on the left" on the right side of the windshield 12. Accordingly, the driver can recognize that no obstacle is present ahead on the left of the vehicle while looking ahead on the right of the vehicle. Also in this case, no information relating to the right-forward direction, which is the direction of the line of sight of the driver, is notified. Thus, the driver does not feel troublesome.

Similarly, when the control unit 11 determines that a time during which the direction of the line of sight of the driver is tilted by a predetermined angle or more in the left direction relative to the traveling direction of the vehicle has continued for a predetermined time (e.g., several seconds), the control unit 11 determines that the direction of the line of sight of the driver is tilted in the left direction (S4: YES). Then, the control unit 11 determines whether an obstacle is present ahead on the right of the vehicle by the obstacle determination section 11b (S9). At this time, the control unit 11 performs processing of an image signal corresponding to the right side of the angle of view of the vehicle-surroundings imaging camera 4 in preference to processing of an image signal corresponding to the left side of the angle of view. Further, the control unit 11 performs processing of a detection signal input from the right front sensor 5 in preference to processing of a detection signal input from the left front sensor 6.

When the control unit 11 determines that an obstacle is present ahead on the right of the vehicle (S10: YES), the control unit 11 notifies that the obstacle is present ahead on the right of the vehicle by the notification control section 11c (S11). Specifically, when an obstacle is detected ahead on the right of the vehicle when the direction of the line of sight of the driver is tilted in the left direction, the control unit 11 outputs a voice output command signal to the right speaker 8 to cause the right speaker 8 to output voice information such as "an obstacle is present ahead on the right, please pay attention". Further, the control unit 11 outputs a display command signal to the information display device 10 to cause the information display device 10 to project and display display information such as "an obstacle is present ahead on the right, please pay attention" on the right side of the windshield 12. Accordingly, the driver can recognize that the obstacle is present ahead on the right of the vehicle while looking ahead on the left of the vehicle. Further, no information relating to the left-forward direction, which is the direction of the line of sight of the driver, is notified. Thus, the driver does not feel troublesome.

On the other hand, when the control unit 11 determines that no obstacle is present ahead on the right of the vehicle (S10: NO), the control unit 11 notifies that no obstacle is present ahead on the right of the vehicle by the notification control section 11c (S12). Specifically, when no obstacle is detected ahead on the right of the vehicle when the direction of the line of sight of the driver is tilted in the left direction, the control unit 11 outputs a voice output command signal to the right speaker 8 to cause the right speaker 8 to output voice information such as "no obstacle is present ahead on the right". Further, the control unit 11 outputs a display command signal to the information display device 10 to cause the information display device 10 to project and display display information such as "no obstacle is present ahead on the right" on the left side of the windshield 12. Accordingly, the driver can recognize that no obstacle is present ahead on the right of the vehicle while looking ahead on the left of the vehicle. Also in this case, no information relating to the left-forward direction, which is the direction of the line of sight of the driver, is notified. Thus, the driver does not feel troublesome.

When the control unit 11 determines that the vehicle-surroundings monitoring process end condition is not satisfied (S2: NO), the control unit 11 returns to step S1 and repeatedly performs step S1 and the following steps. When the control unit 11 determines that the vehicle-surroundings monitoring process end condition, such as switching of the ignition switch from on to off, is satisfied (S2: YES), the control unit 11 finishes the own vehicle-surroundings monitoring process.

In the above configuration, when the control unit 11 determines that no obstacle is present ahead on the left or ahead on the right of the vehicle, the control unit 11 notifies that no obstacle is present ahead on the left or ahead on the right of the vehicle. However, the control unit 11 may perform a notification only when it is determined that an obstacle is present and perform no notification when it is determined that no obstacle is present.

Figure 7:
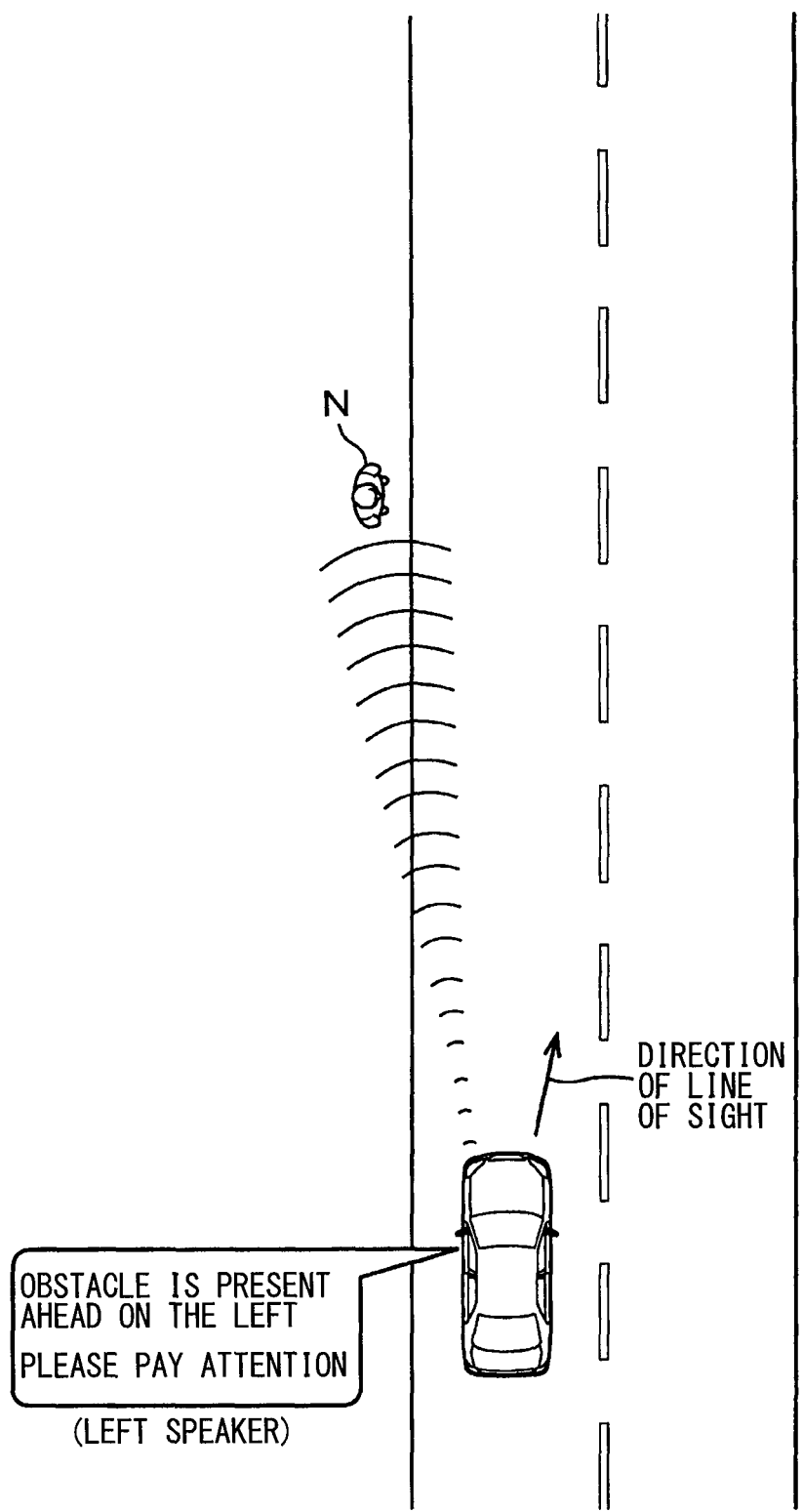
FIG. 7 is a diagram illustrating a mode in which the presence of an obstacle is determined (No. 3)
Figure 8:
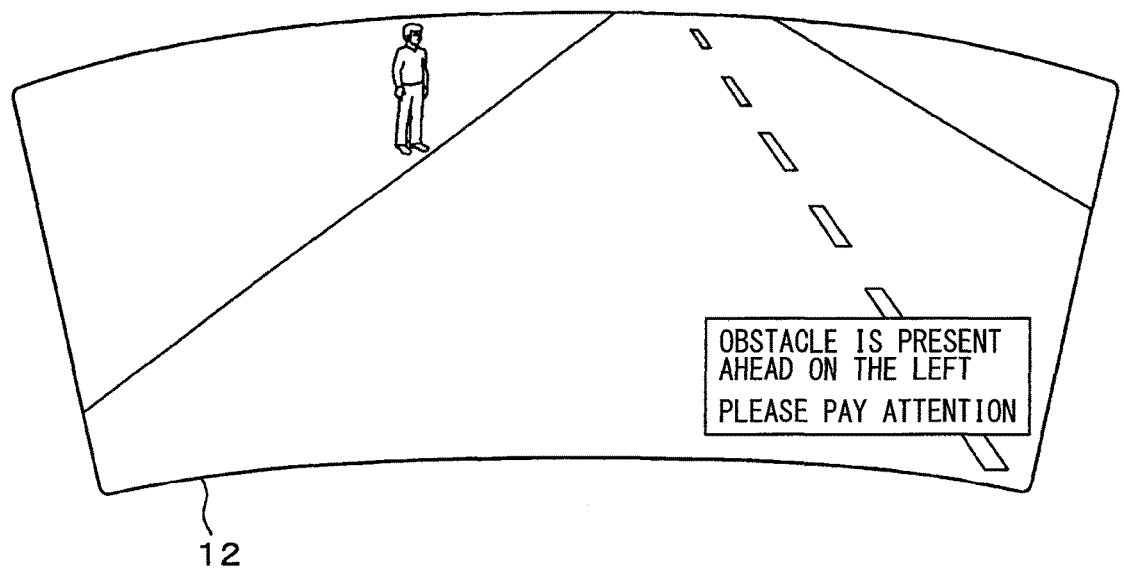
FIG. 8 is a diagram illustrating a mode in which display information is displayed (No. 3)
Figure 9:
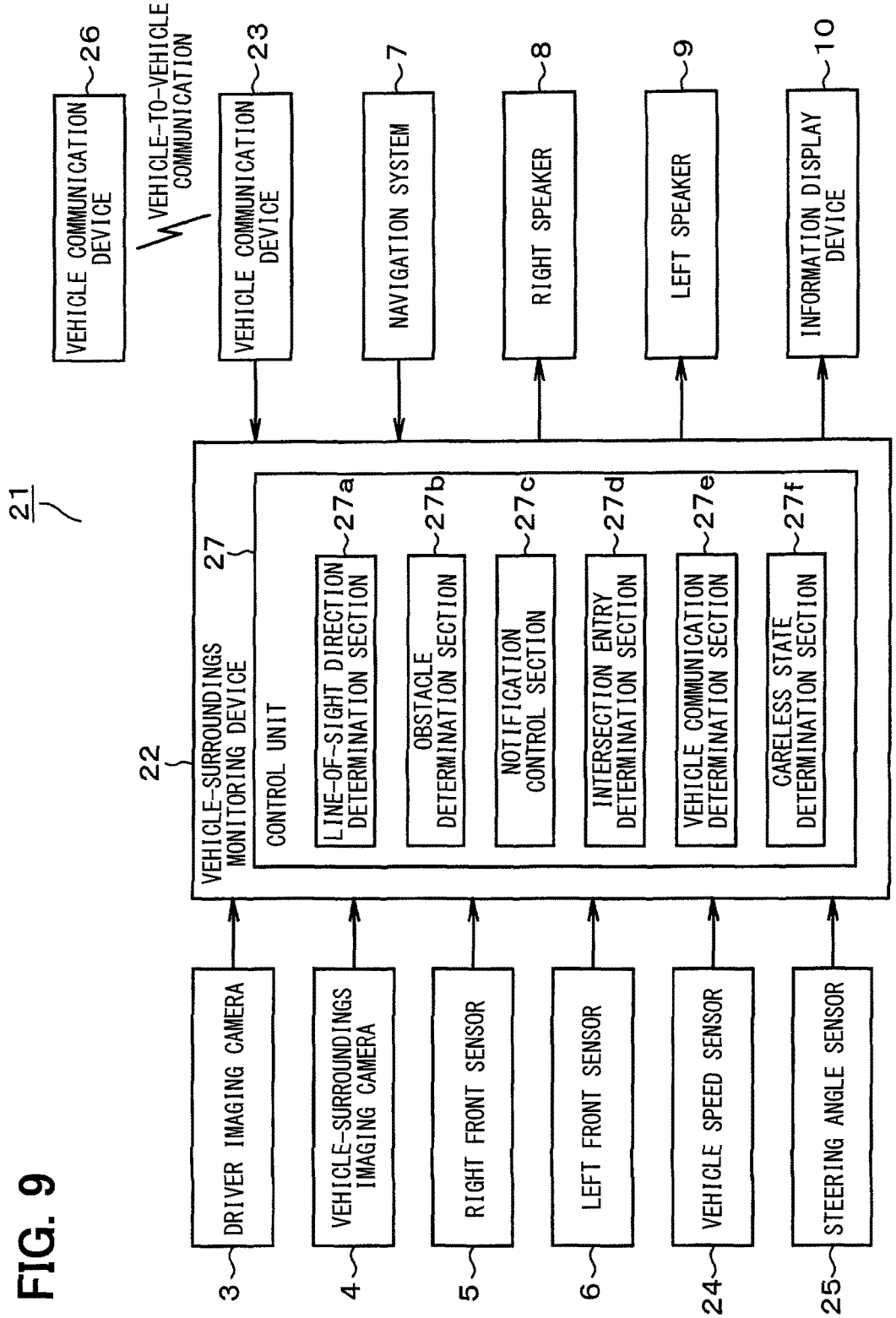
FIG. 9 is a functional block diagram illustrating a second embodiment.
Figure 10:
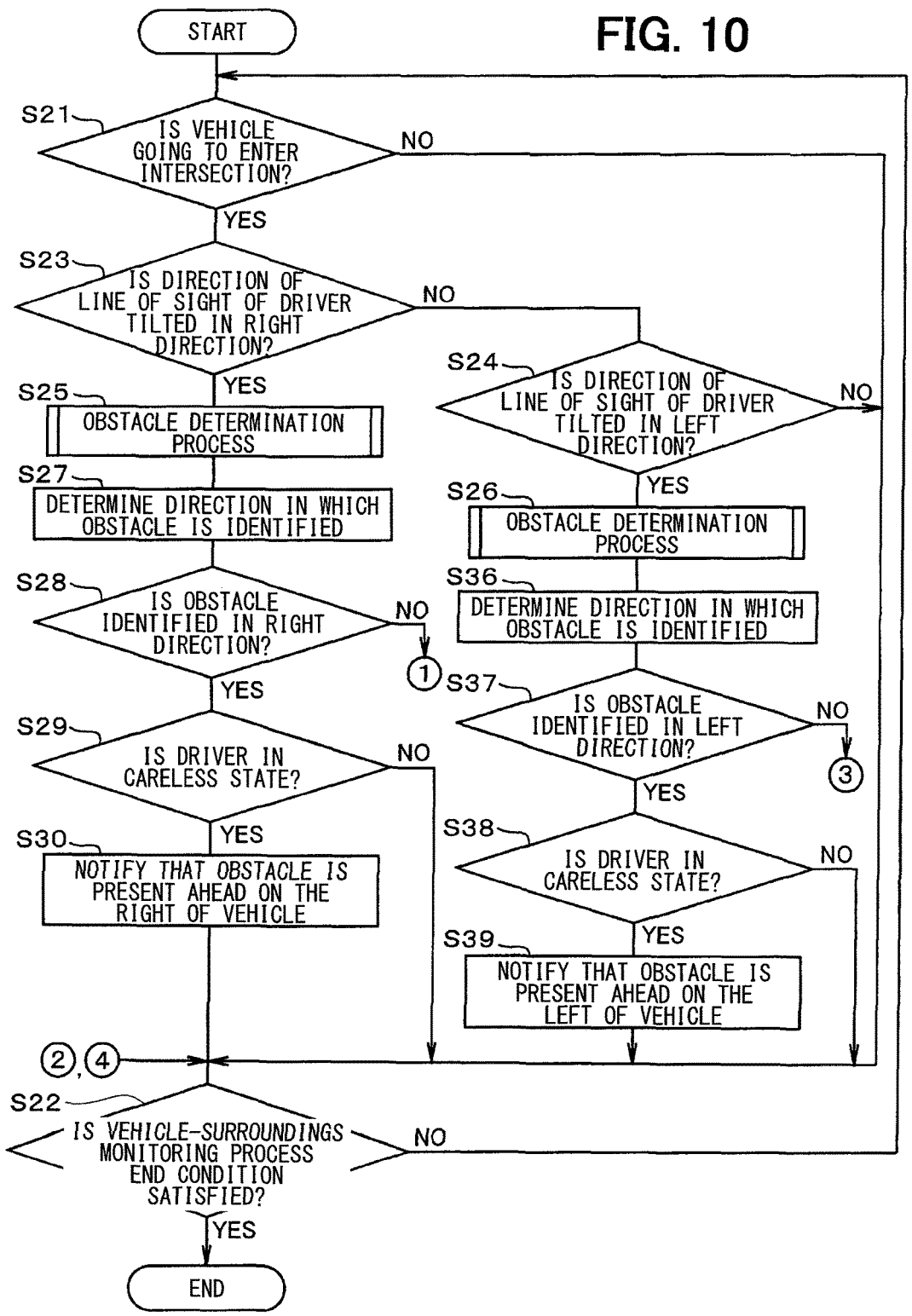
FIG. 10 is a flowchart (No. 2)
Figure 11:
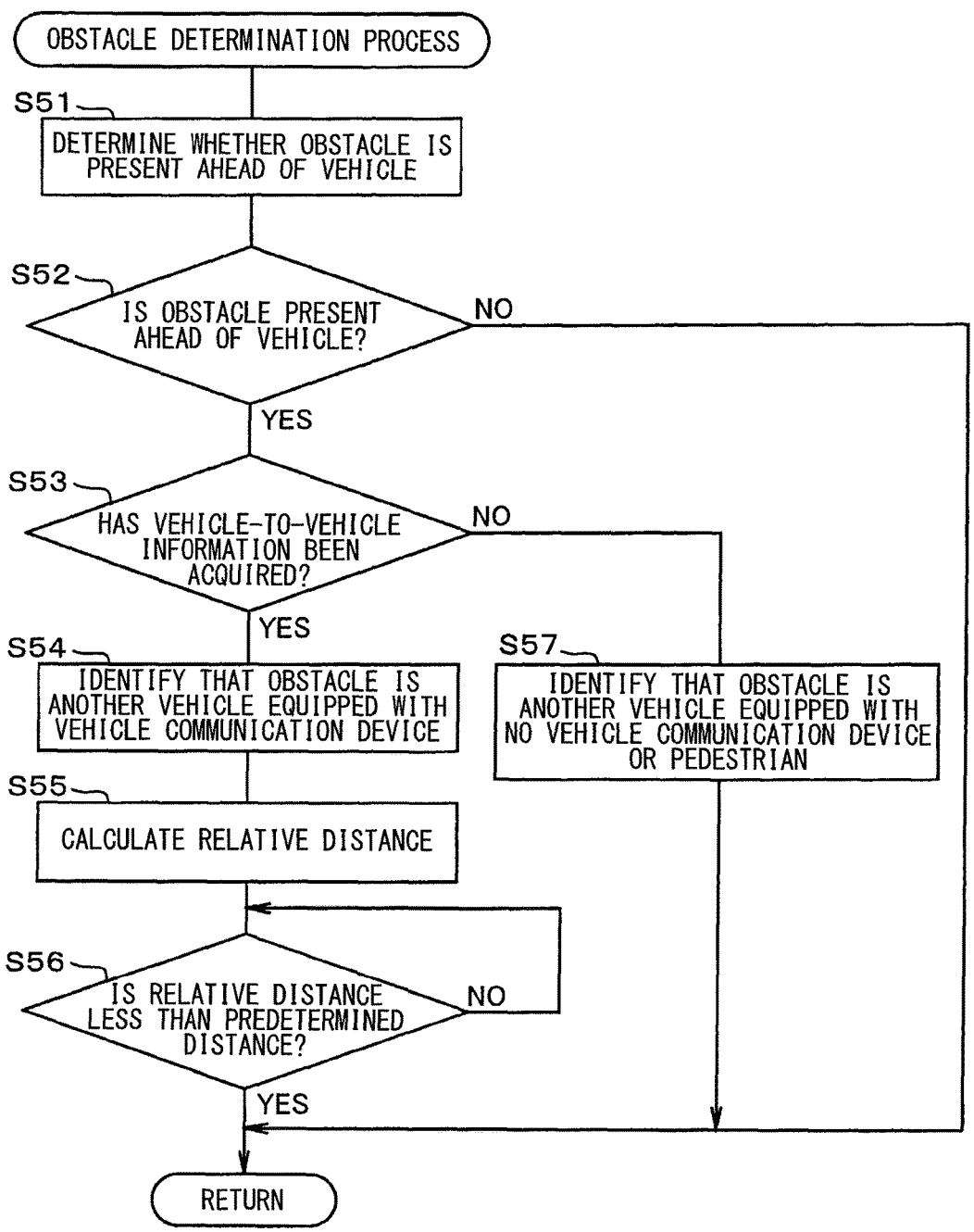
FIG. 11 is a flowchart (No. 3)
Figure 12:
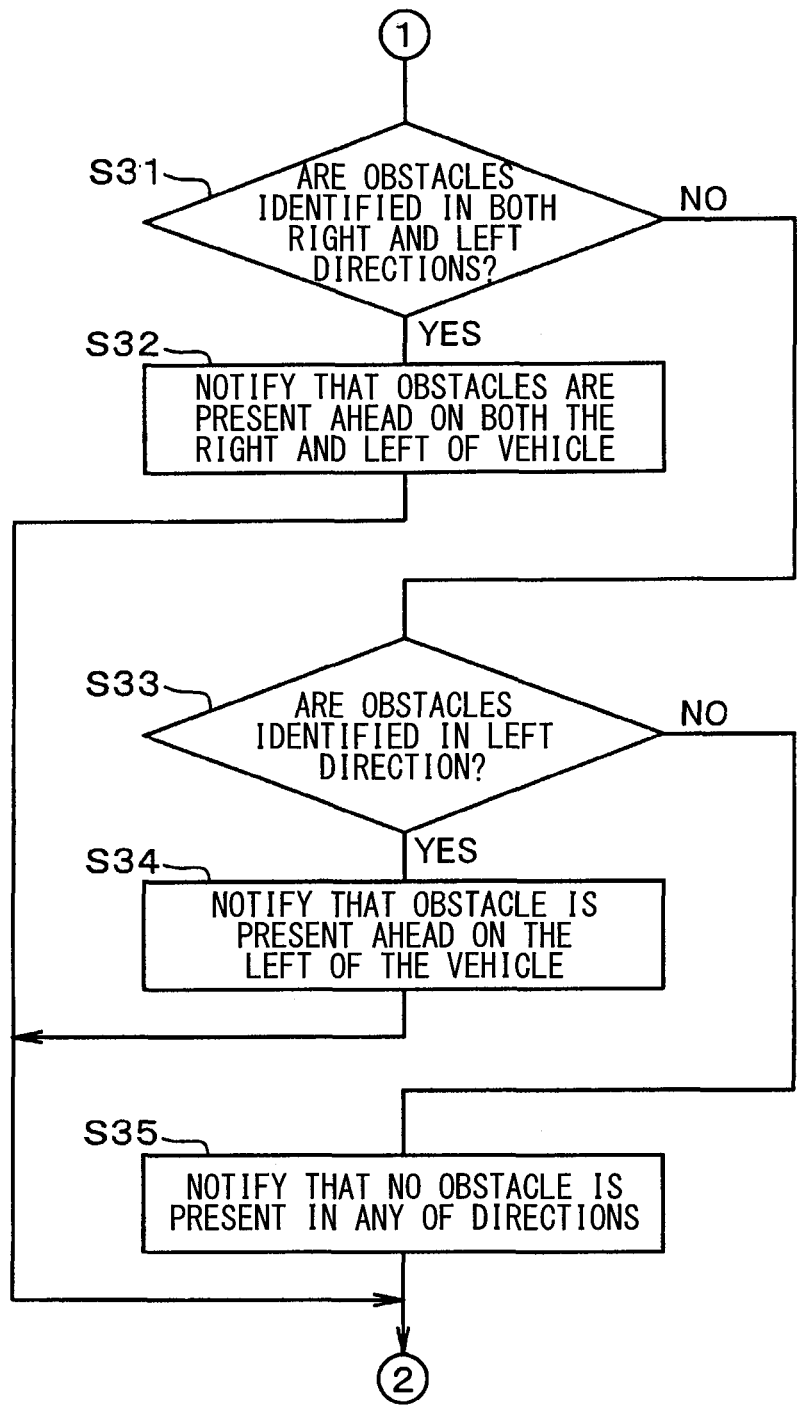
FIG. 12 is a flowchart (No. 4)
Figure 13:
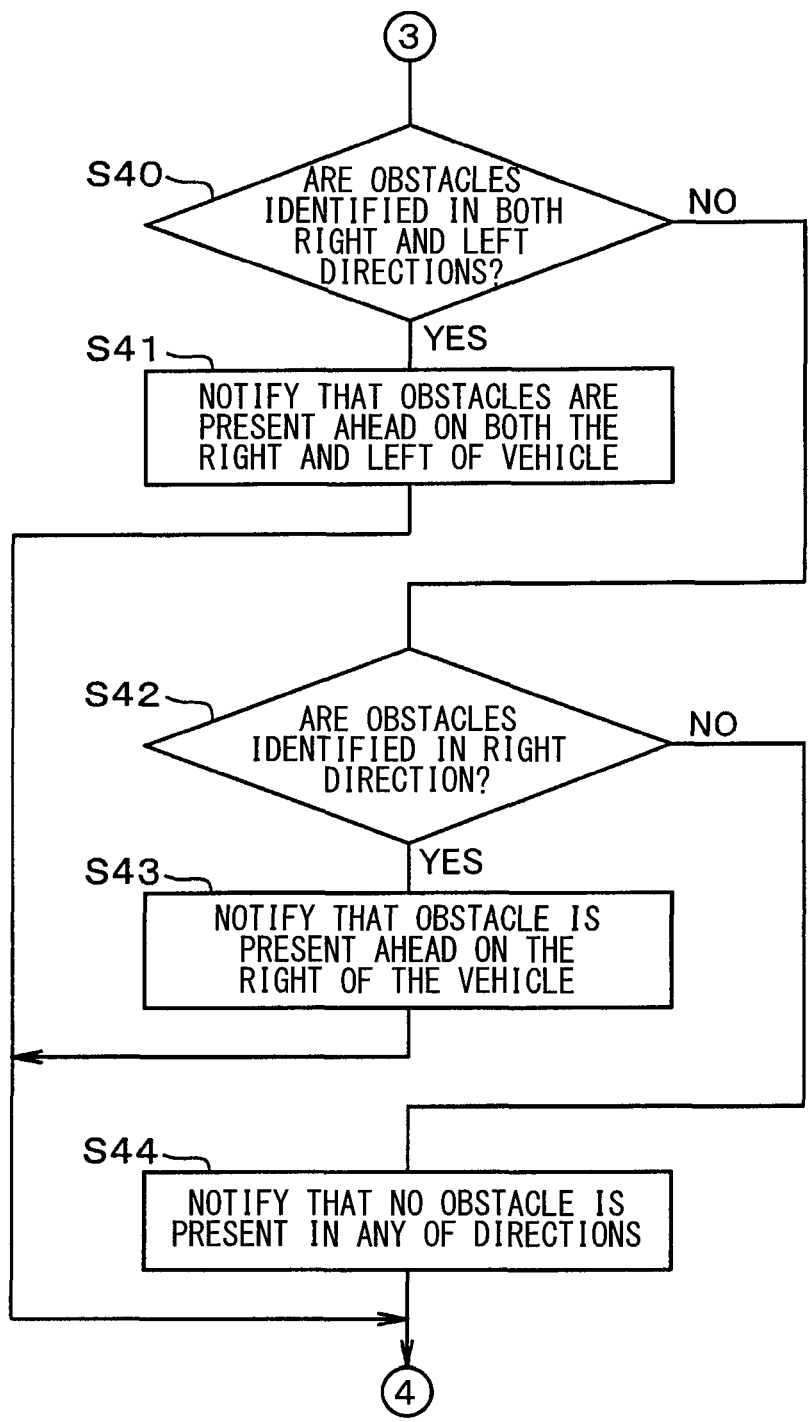
FIG. 13 is a flowchart (No. 5)

In the above configuration, when the control unit 11 determines that the vehicle is going to enter an intersection, the control unit 11 determines the direction of the line of sight of the driver and determines whether an obstacle is present around the vehicle. However, the control unit 11 may determine the direction of the line of sight of the driver and determine whether an obstacle is present regardless of the entry of the vehicle into an intersection. That is, even under the condition where the vehicle is not going to enter an intersection, as illustrated in FIG. 7, when a pedestrian N beside a road is detected as an obstacle ahead on the left of the vehicle when the direction of the line of sight of the driver is tilted in the right direction, voice information such as "an obstacle is present ahead on the left, please pay attention" may be output from the left speaker 9. Further, as illustrated in FIG. 8, display information such as "an obstacle is present ahead on the left, please pay attention" may be projected and displayed on the right side of the windshield 12.

As describe above, according to the first embodiment, the following effects can be obtained.

In the vehicle-surrounding monitoring device 2, when it is determined that the direction of the line of sight of the driver is tilted in one of the right and left directions, it is determined whether an obstacle is present in the other direction around the vehicle, and a result of the determination is notified. Thus, it is possible to appropriately notify the driver that the obstacle is present around the vehicle without giving the driver a troublesome feeling.

In the vehicle-surrounding monitoring device 2, when it is determined that the direction of the line of sight of the driver is tilted in one of the right and left directions, a process of detecting an obstacle in the other direction around the vehicle is performed in preference to a process of detecting an obstacle in the one direction around the vehicle. Thus, it is possible to appropriately distribute a processing capacity and appropriately reduce a processing load.

In the vehicle-surrounding monitoring device 2, when it is determined that an obstacle is present around the vehicle, it is notified that the obstacle is present. When it is determined that no obstacle is present around the vehicle, it is notified that no obstacle is present. Thus, it is possible to appropriately notify not only the presence of an obstacle, but also the nonpresence of an obstacle. Thus, it is possible to appropriately perform driving support.

In the vehicle-surrounding monitoring device 2, when the vehicle is going to enter an intersection, the direction of the line of sight of the driver is determined, and it is determined whether an obstacle is present around the vehicle. Thus, it is possible to appropriately perform driving support under the condition where the vehicle enters the intersection.

In the vehicle-surrounding monitoring device 2, for example, when the direction of the line of sight of the driver is tilted in the right direction, voice information that indicates a result of a determination whether an obstacle is present ahead on the left of the vehicle is output from the left speaker 9. Thus, the driver can intuitively recognize that the determination result corresponds to an area ahead on the left by listening to the voice information coming from the left side. Further, display information that indicates the result of the determination whether an obstacle is present ahead on the left of the vehicle is projected and displayed on the right side of the windshield 12. Thus, the driver can recognize the determination result without shifting the line of sight. For example, the same applies to a case where the direction of the line of sight of the driver is tilted in the left direction.

Second Embodiment

Next, a second embodiment will be described with reference to FIGS. 9 to 19. Description for the same part as the above first embodiment will be omitted, and only a different part will be described.

A vehicle-surroundings monitoring system 21 includes a vehicle-surrounding monitoring device 22, and includes a vehicle communication device 23, a vehicle speed sensor 24, and a steering angle sensor 25 in addition to the cameras 3, 4, the sensors 5, 6, the navigation system 7, the speakers 8, 9, and the information display device 10 described in the first embodiment.

The vehicle communication device 23 performs vehicle-to-vehicle communication with a vehicle communication device 26 which is mounted on another vehicle present around the own vehicle and outputs an information signal including vehicle-to-vehicle information acquired by the vehicle-to-vehicle communication to the vehicle-surrounding monitoring device 22. The vehicle-to-vehicle information acquired by the vehicle communication device 23 by the vehicle-to-vehicle communication with the vehicle communication device 26 includes a current position, a vehicle speed, an acceleration amount (that is, the amount of change in acceleration), and a braking amount (that is, the amount of change in deceleration) of the other vehicle equipped with the vehicle communication device 26. The vehicle speed sensor 24 detects the vehicle speed and outputs a detection signal including a result of the detection to the vehicle-surrounding monitoring device 2. The steering angle sensor 25 detects the steering angle and outputs a detection signal including a result of the detection to the vehicle-surrounding monitoring device 2.

The vehicle-surrounding monitoring device 2 includes a control unit 27. The control unit 27 includes a line-of-sight direction determination section 27a, an obstacle determination section 27b, a notification control section 27c, an intersection entry determination section 27d, a vehicle communication determination section 27e (corresponding to a surroundings information acquisition determination section), and a careless state determination section 27f. Each of the sections 27a to 27f is composed of a computer program executed by the control unit 27 and implemented by software.

The line-of-sight direction determination section 27a, the obstacle determination section 27b, the notification control section 27c, and the intersection entry determination section 27d are equivalent to the line-of-sight direction determination section 11a, the obstacle determination section 11b, the notification control section 11c, and the intersection entry determination section 11d described in the first embodiment, respectively. The vehicle communication determination section 27e determines whether vehicle-to-vehicle communication information has been acquired as vehicle-surroundings information on the basis of whether an information signal has been input from the vehicle communication device 23.

The careless state determination section 27f determines whether the driver is in a careless state using a detection signal input from the vehicle speed sensor 24 and a detection signal input from the steering angle sensor 25. Specifically, the careless state determination section 27f detects the vehicle speed at a predetermined period (e.g., a period of 500 ms) using a detection signal input from the vehicle speed sensor 24 and stores the detected vehicle speed for a predetermined period (e.g., 20 minutes). In addition, the careless state determination section 27f detects the steering angle at a predetermined period (e.g., a period of 500 ms) using a detection signal input from the steering angle sensor 25 and stores the detected steering angle for a predetermined period (e.g., 20 minutes). The careless state determination section 27f calculates, for example, the following T1 to T20 as statistical values for the stored vehicle speed and steering angle.

T1: the mean value of the vehicle speed in the past 10 seconds

T2: the mean value of the vehicle speed in the past 2.5 minutes

T3: the mean value of the vehicle speed in the past 5 minutes

T4: the mean value of the vehicle speed in the past 10 minutes

T5: the mean value of the vehicle speed in the past 20 minutes

T6: the rate of change in the vehicle speed per unit time in the past 10 seconds T7: the rate of change in the vehicle speed per unit time in the past 2.5 minutes T8: the rate of change in the vehicle speed per unit time in the past 5 minutes T9: the rate of change in the vehicle speed per unit time in the past 10 minutes T10: the rate of change in the vehicle speed per unit time in the past 20 minutes T11: the mean value of the steering angle in the past 10 seconds T12: the mean value of the steering angle in the past 2.5 minutes T13: the mean value of the steering angle in the past 5 minutes T14: the mean value of the steering angle in the past 10 minutes T15: the mean value of the steering angle in the past 20 minutes T16: the rate of change in the steering angle per unit time in the past 10 seconds T17: the rate of change in the steering angle per unit time in the past 2.5 minutes T18: the rate of change in the steering angle per unit time in the past 5 minutes T19: the rate of change in the steering angle per unit time in the past 10 minutes T20: the rate of change in the steering angle per unit time in the past 20 minutes Here, the rate of change in the vehicle speed or the steering angle per unit time in the past predetermined period is a value defined by the following (Formula 1).

[Formula 1]

$$\text{RATE OF CHANGE} = \sum_{i=1}^{n} \left| \frac{v_{i+1} - v_i}{\Delta t} \right| \quad (1)$$

In Formula (1), $V_{i+1}$ is a value of the (i+1)-th vehicle speed or steering angle stored in the past predetermined period, $V_i$ is a value of the i-th vehicle speed or steering angle stored in the past predetermined period, $\Delta t$ is a period during which the vehicle speed or the steering angle is stored, and n is the number of values of the vehicle speed or the steering angle stored in the past predetermined period.

When the careless state determination section 27f calculates the statistical values T1 to T20, the careless state determination section 27f determines whether each of the calculated statistical values T1 to T20 falls within a numerical value range which is previously set. When a corresponding statistical value falls within the numerical value range, the careless degree is likely to increase. On the other hand, when a corresponding statistical value falls outside the numerical value range, the careless degree is likely to decrease. The numerical value range is determined as follows. The driver subjectively evaluates the careless degree of himself or herself, for example, on a scale of 0 to 5 during traveling of the vehicle. Here, "0" indicates the lowest careless degree, and "5" indicates the highest careless degree. The subjective evaluation of the careless degree by the driver is periodically and repeatedly performed, and the vehicle speed and the steering angle are continuously detected during traveling of the vehicle to periodically and repeatedly calculate the statistical values T1 to T20. The careless state determination section 27f compares a transition in the subjective evaluation of the careless degree by the driver with calculation results of the statistical values T1 to T20 to determine the numerical value range described above. The careless state determination section 27f compares the statistical values T1 to T20 with the respective numerical value ranges. When it is determined that all the statistical values T1 to T20 fall within the respective numerical values ranges, the careless state determination section 27f determines that the driver is in a careless state. On the other hand, when it is determined that at least any one of the statistical values T1 to T20 falls outside the corresponding numerical value range, the careless state determination section 27f determines that the driver is not in a careless state.

Next, the action of the configuration described above will be described with reference to FIGS. 10 to 19.

When the control unit 27 starts a vehicle-surroundings monitoring process, the control unit 27 determines whether the vehicle is going to enter an intersection by the intersection entry determination section 27d (S21). When the control unit 27 determines that vehicle is not going to enter an intersection (S21: NO), the control unit 27 determines whether a vehicle-surroundings monitoring process end condition is satisfied (S22). On the other hand, when the control unit 27 determines that the vehicle is going to enter an intersection (S21: YES), the control unit 27 determines the direction of the line of sight of the driver by the line-of-sight direction determination section 27a (S23, S24). When the control unit 11 determines that the direction of the line of sight of the driver is tilted in either the right direction or the left direction (S23: YES, S24: YES), the control unit 11 shifts to an obstacle determination process (S25, S26).

When the control unit 27 shifts to the obstacle determination process and starts the obstacle determination process, the control unit 27 determines whether an obstacle is present ahead of the vehicle by the obstacle determination section 27b using at least any of a detection signal input from the right front sensor 5, a detection signal input from the left front sensor 6, and an information signal input from the vehicle communication device 23 (S51). When the control unit 27 determines that an obstacle is present ahead of the vehicle (S52: YES), the control unit 27 determines whether an information signal has been input from the vehicle communication device 23 and determines whether vehicle-to-vehicle information has been acquired by the vehicle communication section 27e (S53). When the control unit 27 determines that an information signal has been input from the vehicle communication device 23 and vehicle-to-vehicle information has been acquired (S53: YES), the control unit 27 identifies that the obstacle present ahead of the vehicle is another vehicle equipped with the vehicle communication device 26 (S54), and calculates a relative distance from the current position of the own vehicle to the current position of the other vehicle using the acquired vehicle-to-vehicle information (S55).

The control unit 27 determines whether the calculated relative distance is less than a predetermined distance (S56). When the control unit 27 determines that the relative distance is less than the predetermined distance (S56: YES), the control unit 27 finishes the obstacle determination process. On the other hand, when the control unit 27 determines that no information signal has been input from the vehicle communication device 23 and no vehicle-to-vehicle information has been acquired (S53: NO), the control unit 27 identifies that the obstacle present ahead of the vehicle is a vehicle that is not equipped with the vehicle communication device 26 or a pedestrian (S57), and finishes the obstacle determination process.

When the control unit 27 determines that the direction of the line of sight of the driver is tilted in the right direction (S23: YES) and executes the obstacle determination process, the control unit 27 determines the direction in which an obstacle is identified (S27). When the control unit 27 determines that an obstacle is identified in the right direction, that is, the same direction as the direction of the line of sight of the driver (S28: YES), the control unit 27 determines whether the driver is in a careless state by the careless state determination section 27f using a detection signal input from the vehicle speed sensor 24 and a detection signal input from the steering angle sensor 25 (S29). When the control unit 27 determines that the driver is not in a careless state (S29: NO), the control unit 27 performs no notification. On the other hand, when the control unit 27 determines that the driver is in a careless state (S29: YES), the control unit 27 notifies that the obstacle is present ahead on the right of the vehicle by the notification control section 27c (S30).

Figure 14:
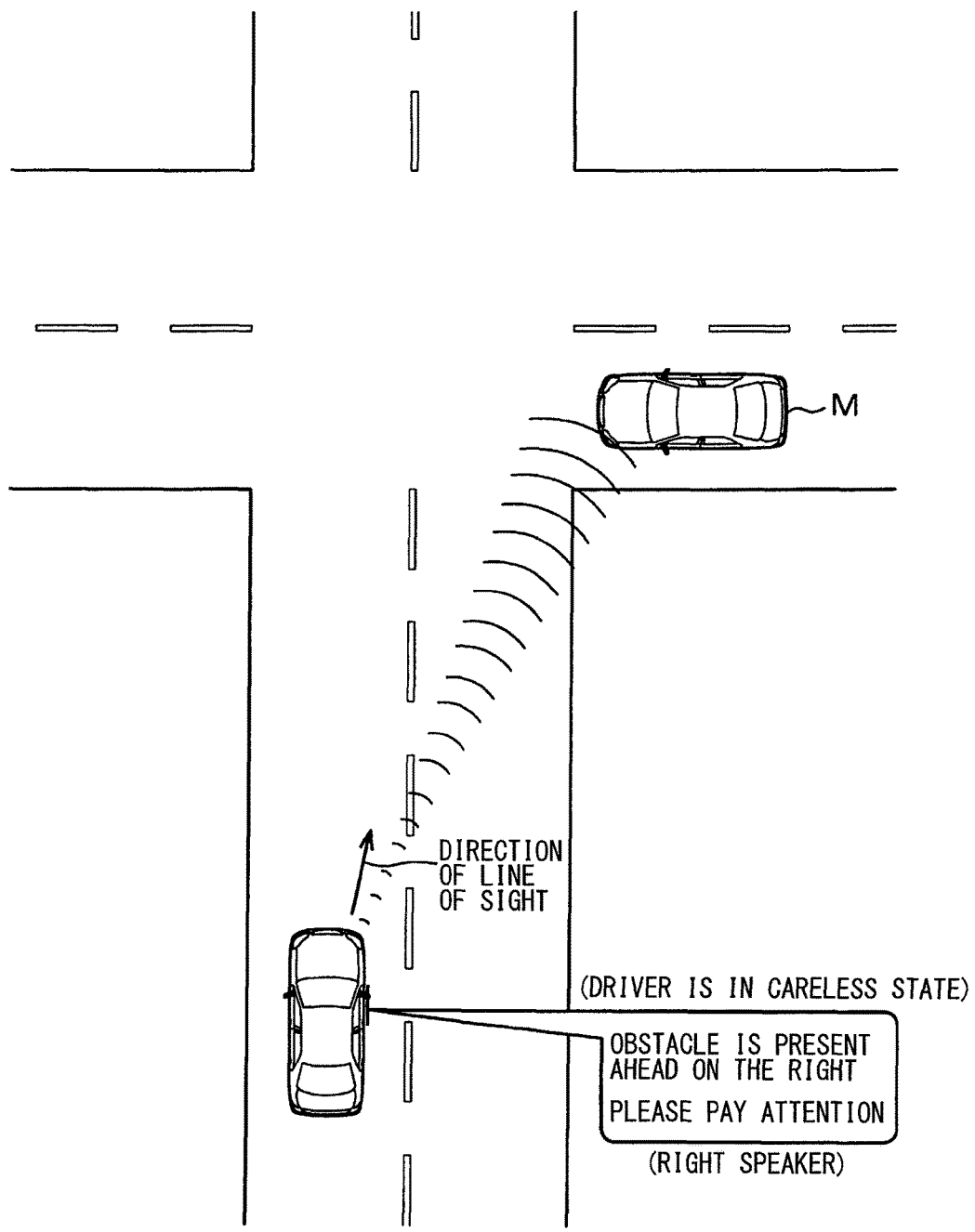
FIG. 14 is a diagram illustrating a mode in which the presence of an obstacle is determined (No. 4)
Figure 15:
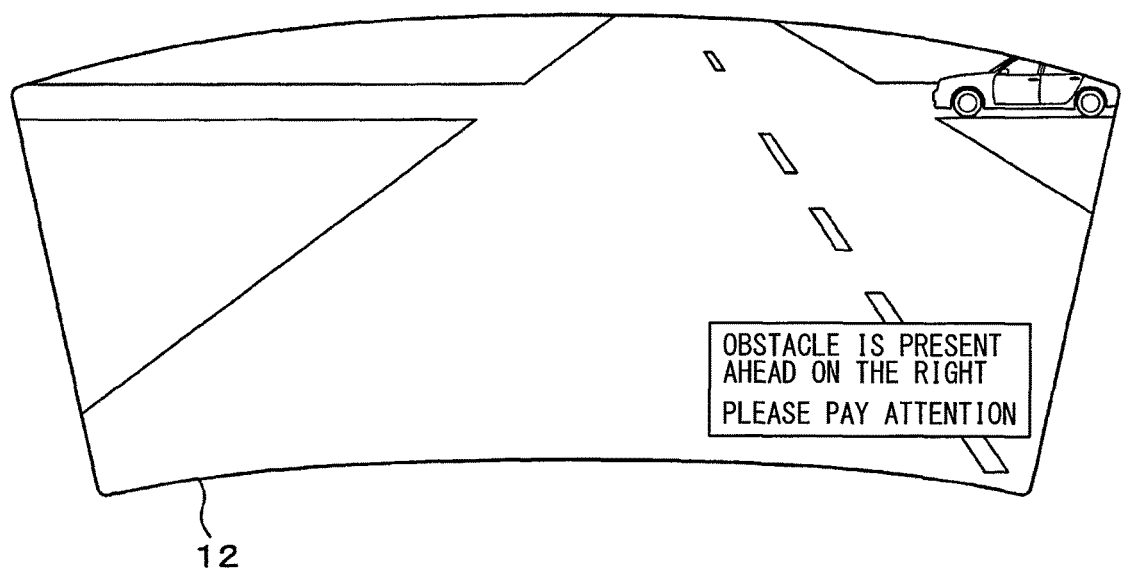
FIG. 15 is a diagram illustrating a mode in which display information is displayed (No. 4)

Specifically, as illustrated in FIG. 14, when another vehicle M in a state of waiting for the entry into an intersection ahead on the right of the vehicle, which is the same direction as the direction of the line of sight of the driver, is detected as an obstacle, the control unit 27 outputs a voice output command signal to the right speaker 8 to cause the right speaker 8 to output voice information such as "an obstacle is present ahead on the right, please pay attention" when the driver is in a careless state. Further, as illustrated in FIG. 15, the control unit 27 outputs a display command signal to the information display device 10 to cause the information display device 10 to project and display display information such as "an obstacle is present ahead on the right, please pay attention" on the right side of a windshield 12. Accordingly, even when the driver is carelessly looking ahead on the right of the vehicle, the driver can get rid of the careless state and recognize that the obstacle is present ahead on the right of the vehicle.

Figure 16:
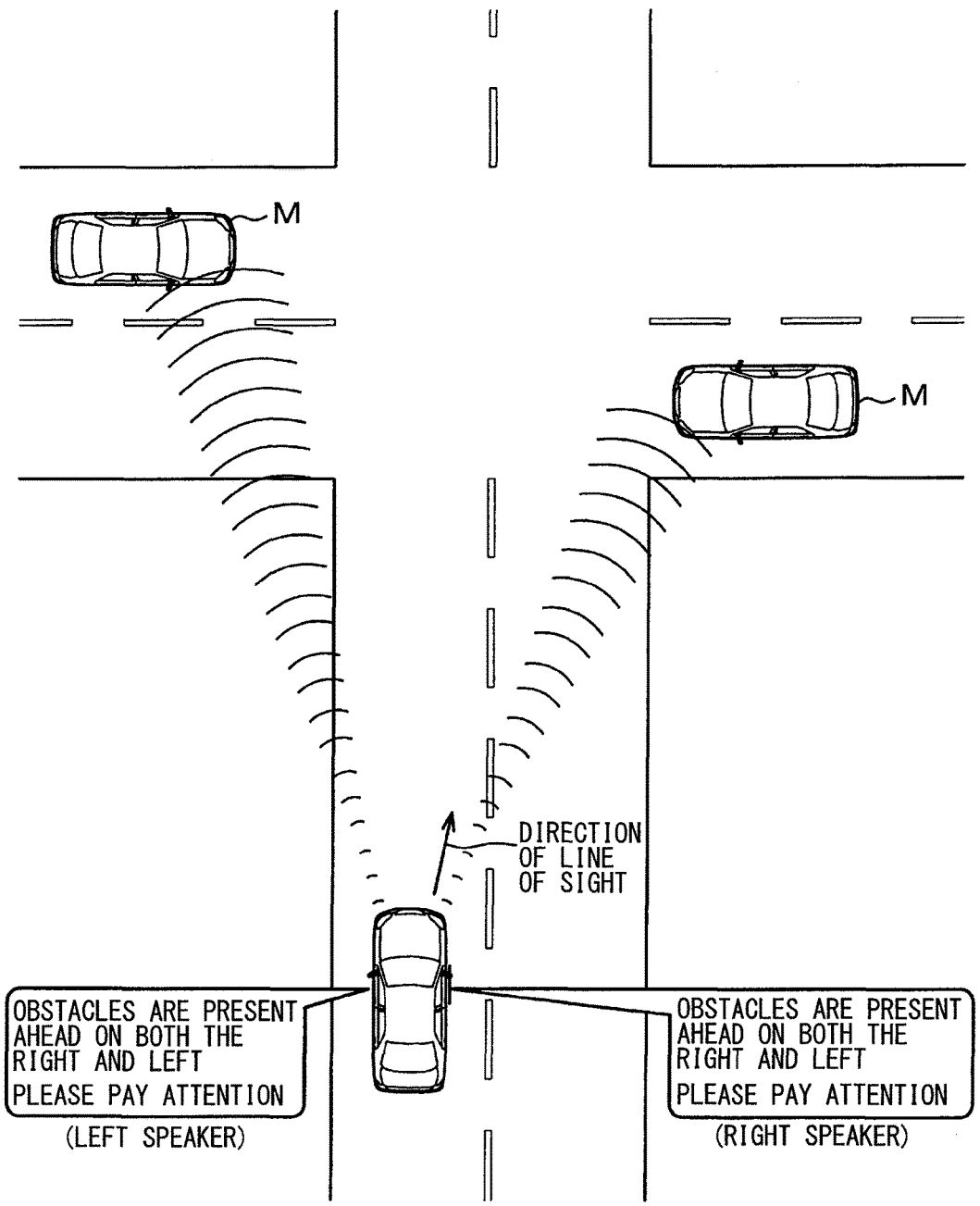
FIG. 16 is a diagram illustrating a mode in which the presence of an obstacle is determined (No. 5)
Figure 17:
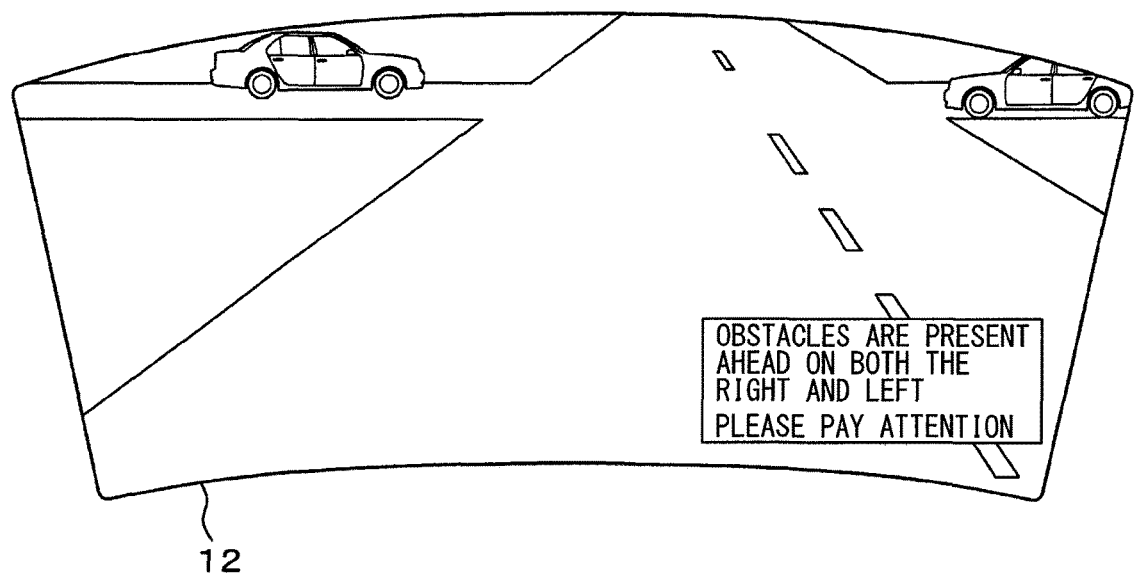
FIG. 17 is a diagram illustrating a mode in which display information is displayed (No. 5)

When the control unit 27 determines that obstacles are identified in both the right and left directions (S31: YES), the control unit 27 notifies that the obstacles are present ahead on both the right and left of the vehicle by the notification control section 27c (S32). Specifically, as illustrated in FIG. 16, when vehicles M in a state of waiting for the entry into an intersection ahead on both the right and left of the vehicle are detected as obstacles, the control unit 27 outputs a voice output command signal to the right speaker 8 and the left speaker 9 to cause the right speaker 8 and the left speaker 9 to output voice information such as "obstacles are present ahead on both the right and left, please pay attention". Further, as illustrated in FIG. 17, the control unit 27 outputs a display command signal to the information display device 10 to cause the information display device 10 to project and display display information such as "obstacles are present ahead on both the right and left, please pay attention" on the right side of the windshield 12.

Figure 18:
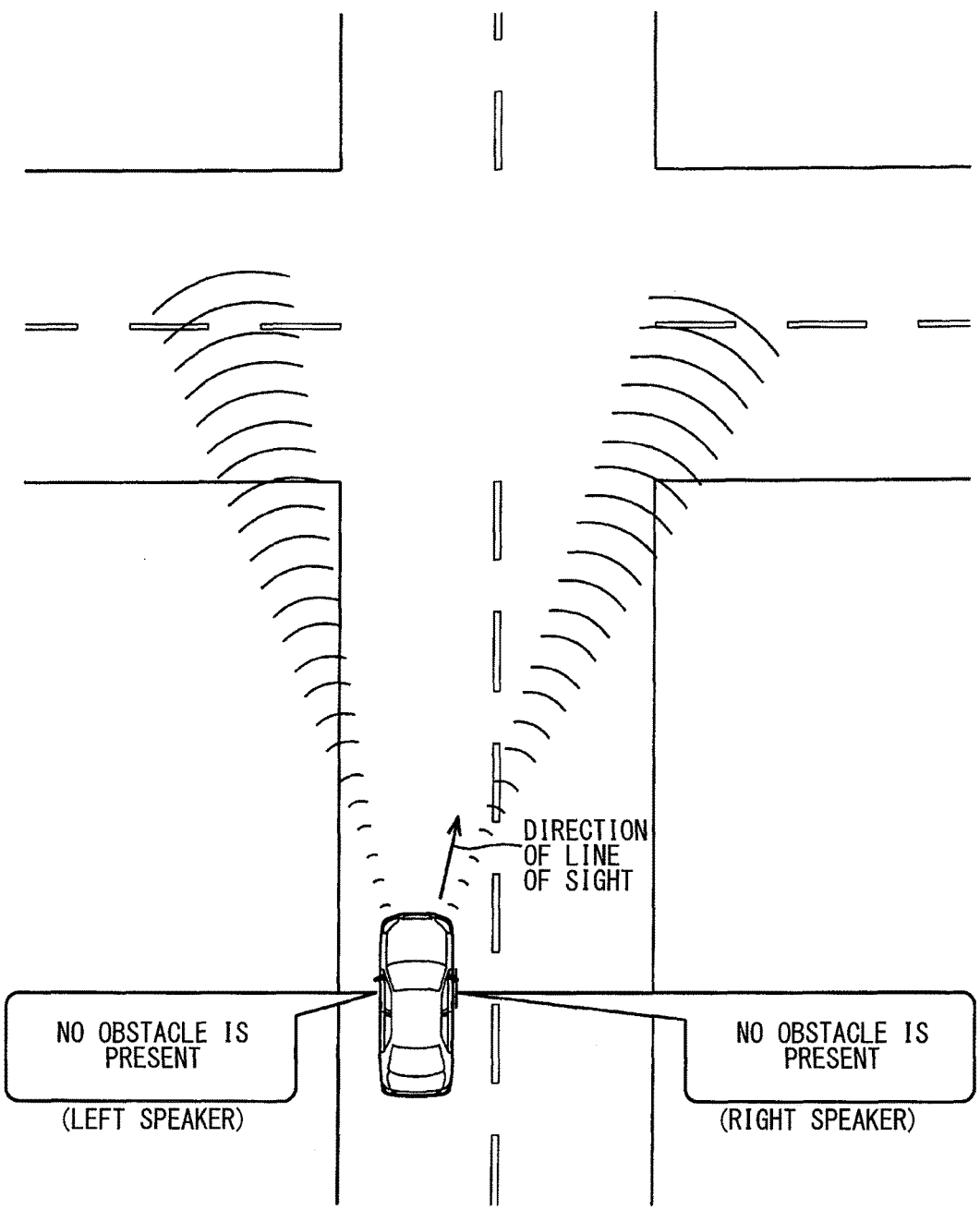
FIG. 18 is a diagram illustrating a mode in which the presence of an obstacle is determined (No. 6)
Figure 19:
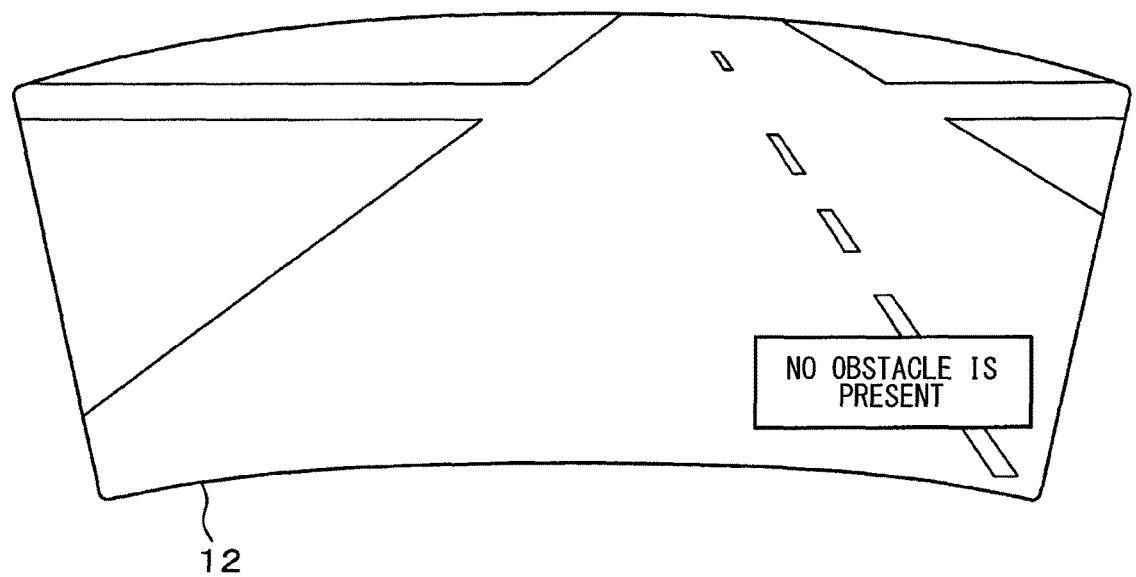
FIG. 19 is a diagram illustrating a mode in which display information is displayed (No. 6).

When the control unit 27 determines that an obstacle is identified in the left direction (S33: YES), the control unit 27 notifies that the obstacle is present ahead on the left of the vehicle by the notification control section 27c in a manner similar to S7 described in the first embodiment (S34). When the control unit 27 determines that no obstacle is identified in any of the directions (S28: NO, S31: NO, S33: NO), the control unit 27 notifies that no obstacle is present in any of the directions by the notification control section 27c (S35). Specifically, as illustrated in FIG. 18, when no obstacle is detected in any of the directions, the control unit 27 outputs a voice output command signal to the right speaker 8 and the left speaker 9 to cause the right speaker 8 and the left speaker 9 to output voice information such as "no obstacle is present". Further, as illustrated in FIG. 19, the control unit 27 outputs a display command signal to the information display device 10 to cause the information display device 10 to project and display display information such as "no obstacle is present" on the right side of the windshield 12.

When the control unit 27 determines that the direction of the line of sight of the driver is tilted in the left direction (S24: YES) and executes the obstacle determination process, the control unit 27 determines the direction in which an obstacle is identified (S36). When the control unit 27 determines that an obstacle is identified in the left direction, that is, the same direction as the direction of the line of sight of the driver (S37: YES), the control unit 27 determines whether the driver is in a careless state by the careless state determination section 27f using a detection signal input from the vehicle speed sensor 24 and a detection signal input from the steering angle sensor 25 (S38). When the control unit 27 determines that the driver is not in a careless state (S38: NO), the control unit 27 performs no notification. On the other hand, when the control unit 27 determines that the driver is in a careless state (S38: YES), the control unit 27 notifies that the obstacle is present ahead on the left of the vehicle by the notification control section 27c (S39).

Specifically, when an obstacle is detected ahead on the left of the vehicle, which is the same direction as the direction of the line of sight of the driver, the control unit 27 performs no notification when the driver is not in a careless state, but outputs a voice output command signal to the left speaker 9 to cause the left speaker 9 to output voice information such as "an obstacle is present ahead on the left, please pay attention" when the driver is in a careless state. Further, the control unit 27 outputs a display command signal to the information display device 10 to cause the information display device 10 to project and display display information such as "an obstacle is present ahead on the left, please pay attention" on the left side of the windshield 12. Accordingly, even when the driver is carelessly looking ahead on the left of the vehicle, the driver can get rid of the careless state and recognize that the obstacle is present ahead on the left of the vehicle.

When the control unit 27 determines that obstacles are identified in both the right and left directions (S40: YES), the control unit 27 notifies that the obstacles are present ahead on both the right and left of the vehicle by the notification control section 27c (S41). Specifically, the control unit 27 outputs a voice output command signal to the right speaker 8 and the left speaker 9 to cause the right speaker 8 and the left speaker 9 to output voice information such as "obstacles are present ahead on both the right and left, please pay attention". Further, the control unit 27 outputs a display command signal to the information display device 10 to cause the information display device 10 to project and display display information such as "obstacles are present ahead on both the right and left, please pay attention" on the left side of the windshield 12.

When the control unit 27 determines that an obstacle is identified in the left direction (S42: YES), the control unit 27 notifies that the obstacle is present ahead on the right of the vehicle by the notification control section 27c in a manner similar to S11 described in the first embodiment (S43). When the control unit 27 determines that no obstacle is identified in any of the directions (S37: NO, S40: NO, S42: NO), the control unit 27 notifies that no obstacle is present in any of the directions by the notification control section 27c (S44). Specifically, the control unit 27 outputs a voice output command signal to the right speaker 8 and the left speaker 9 to cause the right speaker 8 and the left speaker 9 to output voice information such as "no obstacle is present". Further, the control unit 27 outputs a display command signal to the information display device 10 to cause the information display device 10 to project and display display information such as "no obstacle is present" on the left side of the windshield 12.

As described above, according to the second embodiment, the following effects can be obtained.

In the vehicle-surrounding monitoring device 22, when vehicle-to-vehicle information is acquired, it is determined whether an obstacle is present around the vehicle using the acquired vehicle-to-vehicle information. Thus, it is possible to increase the accuracy of determining whether an obstacle is present around the vehicle. That is, it is possible to identify that the obstacle present around the vehicle is another vehicle equipped with the vehicle communication device 26. In the vehicle-surrounding monitoring device 22, when it is identified that the obstacle is the other vehicle equipped with the vehicle communication device 26, a notification can be appropriately performed using the acquired vehicle-to-vehicle information. Further, it is possible to notify the presence of the obstacle at an appropriate timing by performing the notification when the relative distance between the own vehicle and the other vehicle becomes less than a predetermined distance. That is, when the notification is performed under the condition where the relative distance between the own vehicle and the other vehicle is sufficiently large, the driver may feel troublesome due to too early timing of the notification. On the other hand, when the notification is performed under the condition where the relative distance between the own vehicle and the other vehicle is extremely small, safety may not be secured due to too late timing. However, the present embodiment can prevent the occurrence of such a situation in advance.

In the vehicle-surrounding monitoring device 22, even when it is determined that an obstacle is present in the same direction as the direction of the line of sight of the driver, the driver is notified that the obstacle is present in the same direction as the direction of the line of sight of the driver when the driver is in a careless state. Thus, it is possible to get rid of the careless state of the driver and notify that the obstacle is present. On the other hand, when it is determined that an obstacle is present in the same direction as the direction of the line of sight of the driver and the driver is not in a careless state, the driver is not notified that the obstacle is present in the same direction as the direction of the line of sight of the driver. Thus, the driver does not feel troublesome.

Other Embodiments

Although the present disclosure has been described based on the embodiments, it is to be understood that the present disclosure is not limited to the embodiments and structures. The present disclosure also includes various modifications and modifications within the equivalent range thereof. In addition, various combinations or modes, and other combinations or modes including only one element, more, or less thereof are also included in the scope and idea range of the present disclosure.

The configuration that simply notifies the presence of an obstacle is described above as an example. However, it may be notified that an obstacle is a vehicle or a pedestrian by determining whether the obstacle is a vehicle or a pedestrian by an image analysis. That is, notification information such as "a vehicle is approaching from ahead on the left, please pay attention" or "a pedestrian is present ahead on the left, please pay attention" may be notified.

The configuration that is applied to the case where the vehicle moves forward is described above as an example. However, the present disclosure may be applied to a case where the vehicle moves backward. Specifically, the vehicle-surroundings monitoring system may include a driver imaging camera that captures an image of the upper body of a driver who is seated on the driver seat and faces behind of the vehicle, a sensor whose detection area is behind on the right of the vehicle, and a sensor whose detection area is behind on the left of the vehicle. Accordingly, it is possible to appropriately perform parking support under the condition where the vehicle is moved backward and parked.

The configuration that acquires vehicle-to-vehicle information by vehicle-to-vehicle communication as vehicle-surroundings information from the outside of the vehicle is described above as an example. However, road-to-vehicle information by road-to-vehicle communication may be acquired.

As a method for determining whether the driver is in a careless state, an accelerator pedal sensor or a brake pedal sensor may be used to detect the amount by which the accelerator pedal is depressed or the amount by which the brake pedal is depressed, and statistical values may be calculated in a manner similar to the calculation of the statistical values T1 to T20 described above. Further, a method for determining the direction of the line of sight of a driver or a method for detecting a potential difference on the surface of the wrist of a driver may be employed.

What is claimed is:

1. A vehicle-surrounding monitoring device comprising:
   a line-of-sight direction determination section that determines a direction of a line of sight of a driver;
   an obstacle determination section that determines whether an obstacle is disposed in a predetermined direction around a vehicle; and
   a notification control section that notifies notification information indicating a determination result of the obstacle determination section in an other direction around the vehicle with a notification unit when it is determined that the direction of the line of sight of the driver is one direction around the vehicle, wherein:

the notification unit includes a voice output unit that outputs voice information as the notification information; and when it is determined that the direction of the line of sight of the driver is the one direction around the vehicle, the notification control section controls the voice output unit on an other direction side around the vehicle to output the voice information indicating the determination result of the obstacle determination section in the other direction around the vehicle.

2. The vehicle-surrounding monitoring device according to claim 1, wherein:

when it is determined that the direction of the line of sight of the driver is the one direction around the vehicle, the obstacle determination section prioritizes a process of determining whether the obstacle is disposed in the other direction around the vehicle over a process of determining whether the obstacle is disposed in the one direction around the vehicle.

3. The vehicle-surrounding monitoring device according to claim 1, wherein:

the notification control section notifies the notification information indicating that the obstacle is disposed in the other direction around the vehicle with the notification unit when it is determined that the obstacle is disposed in the other direction around the vehicle, and notifies the notification information indicating that no obstacle is disposed in the other direction around the vehicle when it is determined that no obstacle is disposed in the other direction around the vehicle.

4. The vehicle-surrounding monitoring device according to claim 1, wherein:

the obstacle determination section determines whether the obstacle is disposed ahead of the vehicle; and when it is determined that the direction of the line of sight of the driver is the one direction ahead of the vehicle, the notification control section notifies the notification information indicating the determination result of the obstacle determination section in the other direction ahead of the vehicle with the notification unit.

5. The vehicle-surrounding monitoring device according to claim 4, further comprising:

an intersection entry determination section that determines whether the vehicle enters an intersection, wherein:

when it is determined that the vehicle enters the intersection, and the direction of the line of sight of the driver is the one direction ahead of the vehicle, the notification control section notifies the notification information indicating the determination result of the obstacle determination section in the other direction ahead of the vehicle.

6. The vehicle-surrounding monitoring device according to claim 1, wherein:

the notification unit includes a display unit that displays display information as the notification information; and when it is determined that the direction of the line of sight of the driver is the one direction around the vehicle, the notification control section controls the display unit on an one direction side around the vehicle to display the display information indicating the determination result of the obstacle determination section in the other direction around the vehicle.

7. The vehicle-surrounding monitoring device according to claim 1, further comprising:

a vehicle-surrounding information acquisition determination section that determines whether vehicle-surrounding information is acquired from an external device of the vehicle, wherein:

the obstacle determination section determines whether the obstacle is disposed in a predetermined direction around the vehicle using the vehicle-surrounding information acquired from the external device of the vehicle.

8. The vehicle-surrounding monitoring device according claim 7, wherein:

the vehicle-surrounding information acquisition determination section determines whether vehicle-to-vehicle information through vehicle-to-vehicle communication is acquired as the vehicle-surrounding information; and the obstacle determination section determines whether an other vehicle is disposed as the obstacle in the predetermined direction around the vehicle using the vehicle-to-vehicle information.

9. The vehicle-surrounding monitoring device according claim 8, wherein:

when it is determined that the other vehicle is disposed in the predetermined direction around the vehicle, the notification control section notifies the notification information with the notification unit when a relative distance between the vehicle and the other vehicle is less than a predetermined distance.

10. The vehicle-surrounding monitoring device according to claim 1, further comprising:

a careless state determination section that determines whether the driver is in a careless state, wherein:

when it is determined that the direction of the line of sight of the driver is the one direction around the vehicle, the obstacle is disposed in the one direction around the vehicle that is a same direction as the direction of the line of sight of the driver, and the driver is in the careless state, the notification control section notifies the notification information indicating that the obstacle is disposed in the one direction around the vehicle with the notification unit.

11. The vehicle-surrounding monitoring device according to claim 10, wherein:

when it is determined that the direction of the line of sight of the driver is the one direction around the vehicle, the obstacle is disposed in the one direction around the vehicle that is the same direction as the direction of the line of sight of the driver, and the driver is not in the careless state, the notification control section does not notify the notification information indicating that the obstacle is disposed in the one direction around the vehicle with the notification unit.

12. A non-transitory computer readable storage medium that stores a computer program that controls a control unit of a vehicle-surrounding monitoring device to execute:

a line-of-sight direction determination process of determining a direction of a line of sight of a driver;

an obstacle determination process of determining whether an obstacle is disposed in an other direction around the vehicle when it is determined that the direction of the line of sight of the driver is one direction;

a notification control process of notifying a determination result of the obstacle determination process with a notification unit including a voice output unit that outputs voice information as notification information by outputting the voice information indicating the determination result of the obstacle determination process in the other direction around the vehicle with the voice output unit on an other direction side around the vehicle.

* * * * *